United States Patent [19]                [11] Patent Number: 4,929,015
Bauer                                       [45] Date of Patent:   May 29, 1990

[54] CONVERTIBLE TOP FOR VEHICLES, PARTICULARY FOR MOTOR CARS

[75] Inventor: Theodor Bauer, Altenriet, Fed. Rep. of Germany

[73] Assignee: Daimler-Benz AG, Fed. Rep. of Germany

[21] Appl. No.: 215,505

[22] Filed: Jul. 6, 1988

Related U.S. Application Data

[63] Continuation-in-part of Ser. No. 14,848, Feb. 13, 1987, abandoned, which is a continuation of Ser. No. 702,660, Feb. 19, 1985, abandoned.

[30] Foreign Application Priority Data

Feb. 18, 1984 [DE] Fed. Rep. of Germany ....... 3405920

[51] Int. Cl.$^5$ .................................................. B60 7/12
[52] U.S. Cl. .................................... 296/116; 296/121; 296/122
[58] Field of Search ............... 296/107, 116, 117, 121, 296/122, 134

[56] References Cited

U.S. PATENT DOCUMENTS

| 1,552,216 | 9/1925 | Eddy | 296/107 |
| 2,592,512 | 4/1952 | Fodermaier, Jr. | 296/116 |
| 2,768,857 | 10/1956 | Albrecht | 296/117 |
| 2,794,672 | 6/1957 | Burzi | 296/107 |
| 2,860,913 | 11/1958 | Kuiper et al. | 296/107 |
| 3,323,830 | 6/1967 | Husko et al. | 296/116 |
| 3,473,842 | 10/1969 | Bracey | 296/116 |
| 3,994,524 | 11/1976 | Lehmann | 296/107 |
| 4,573,732 | 3/1986 | Muscat | 296/116 X |
| 4,720,134 | 1/1988 | Seifert | 296/118 |
| 4,828,317 | 5/1989 | Muscat | 296/107 X |

FOREIGN PATENT DOCUMENTS

| 24792 | of 1911 | United Kingdom | 296/116 |
| 16255 | of 1915 | United Kingdom | 296/116 |
| 836677 | 6/1960 | United Kingdom | 296/107 |
| 2154955 | 9/1985 | United Kingdom | 296/116 |

OTHER PUBLICATIONS

Motor, Aug. 1959, pp. 42-43.

Primary Examiner—Dennis H. Pedder
Attorney, Agent, or Firm—Evenson, Wands, Edwards, Lenahan & McKeown

[57] ABSTRACT

A foldable frame of the present invention is provided for supporting a convertible top of a vehicle having a tonneau space. The foldable frame is movable between a retracted and an extended position and includes a main hoop mounted to respective opposite sides of the vehicle for pivotable movement about a transverse axis of the vehicle, a pair of main guide rods, a pair of foldable roof side frames, a pair of roof frame guide rods for controlling the movement of the front members of each of the foldable roof side frames, and an intermediate hoop situated intermediate the roof front frame and the main hoop. The main hoop is of substantially trapezoidal shape and inculdes a pair of laterally spaced-apart diverging side members. The ends of the intermediate hoop are coupled to one of the roof frame guide rods for pivotable movement in relation thereto so that the length of the intermediate hoop is variable during retraction and extension of the foldable frame. The main guide rod is deflectable along a transverse axis of the vehicle so that each pair of roof side frame members is aligned in side-by-side relation with its companion inclined side member of the main hoop when the fold frame is moved to its retracted position. The tonneau space is increased when the foldable frame is fully retracted since the tonneau space is determined substantially by the diverging outwardly-canted side members of the trapezoidally shaped main hoop instead of the more narrow space between the substantially spaced-apart parallel roof side frames.

12 Claims, 10 Drawing Sheets

FIG.3
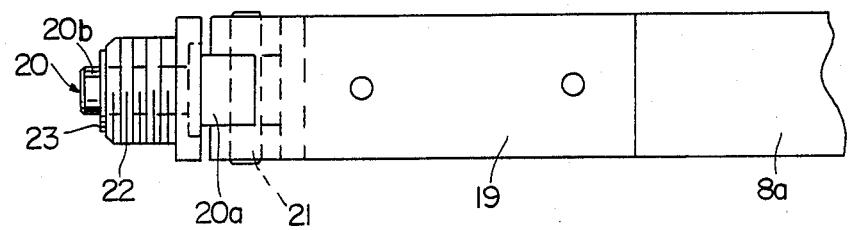
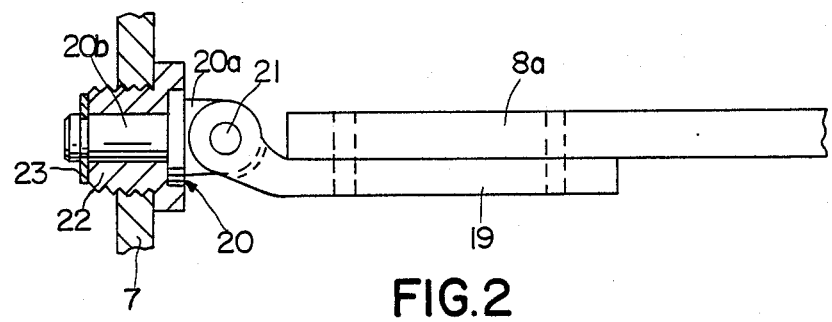
FIG.2

FIG.8a
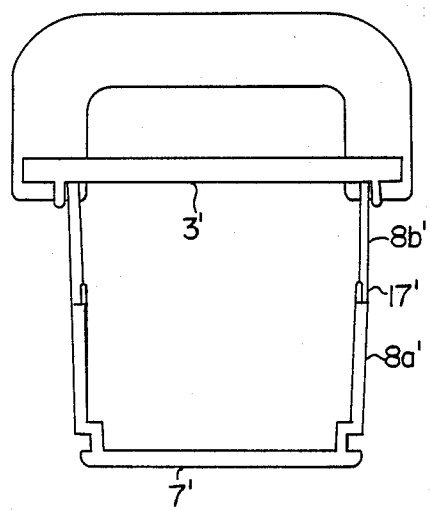
FIG.8b
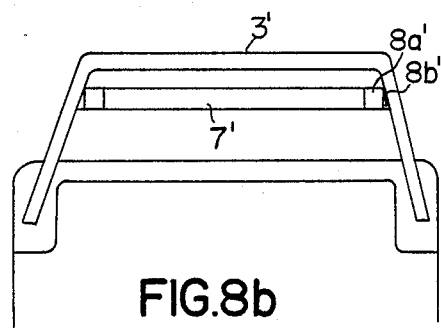
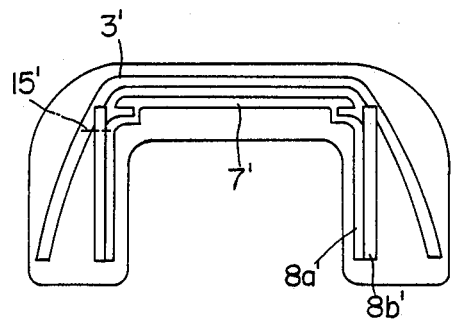
FIG.8c

CONVERTIBLE TOP FOR VEHICLES, PARTICULARY FOR MOTOR CARS

BACKGROUND AND SUMMARY OF THE INVENTION

This application is a Continuation-in-Part of pending application Ser. No. 014,848, filed Feb. 13, 1987, now abandoned, which was a Continuation Application of application Ser. No. 702,660, filed Feb. 19, 1985, now abandoned.

This invention relates to a convertible top for use on a vehicle, and particularly to a convertible top having a frame that is foldable to increase the tonneau space of the vehicle.

A support frame for a convertible top can include a trapezoidally shaped main hoop pivotable about a transverse axis of the vehicle, in the lateral regions of which a two-part foldable roof side frame consisting of a front and a rear roof frame side part is mounted pivotably on each of two sides, two roof frame guide rods mounted on the main hoop for controlling the movement cycle of the front roof side frames, two main guide rods attached to the vehicle body, on each of which the associated roof side frame is guided, a roof front frame connecting the roof side frames, and an intermediate hoop arranged between the roof front frame and the main hoop.

A convertible top of this type is disclosed in German Patent No. 2,327,486. In such convertible tops, all the axes of rotation of the hood kinematics are coaligned and oriented at right angles to the vertical longitudinal median plane of the vehicle. In the case of contemporary streamlined body shapes with a pronounced lateral inclination of the top, when the top is folded back this leads to a substantial loss in width of the tonneau space, because its inside width is determined by the interval of the lateral roof frames.

The underlying aim of the invention is to develop further a support frame for a convertible top so that when the convertible top is folded back the tonneau space is determined not by the interval of the roof side frames, but substantially by the diverging dimensions of the trapezoidally shaped main hoop of the support frame.

According to a preferred embodiment of the present invention, a foldable frame is provided for supporting a convertible top of a vehicle having a tonneau space. The foldable frame is movable between a retracted and an extended position and includes a main hoop mounted to respective opposite sides of the vehicle for pivotable movement about a transverse axis of the vehicle, a pair of main guide rods, a pair of foldable roof side frames, a pair of roof frame guide rods for controlling the movement of the front members of each of the foldable roof side frames, a roof front frame connected to the roof side frames, and an intermediate hoop situated intermediate the roof front frame and the main hoop.

The main hoop is of substantially trapezoidal shape and includes a pair of laterally spaced-apart outwardly canted side members. Each main guide rod includes a proximal end, a distal end, and first joint means for coupling the proximal end to one of the respective opposite sides of the vehicle body for pivotal movement about a first joint axis. Each roof side frame includes a front member, a rear member, first pin means for coupling the front member to the rear member for pivotal movement about a first pin axis, and second joint means for coupling the rear member to the distal end of one of said main guide rods for pivotal movement about a second joint axis. Each roof frame guide rod includes a forward end, a rearward end, second pin means for coupling the forward end to one of the front members for pivotal movement about a second pin axis, and third pin means for coupling the rearward end to the main hoop for pivotal movement about a third pin axis. The intermediate hoop includes opposite ends.

The foldable frame further includes means for connecting each of the ends of the intermediate hoop to one of the roof frame guide rods for pivotable movement in relation thereto. The connecting means includes yieldable means for varying the length of the intermediate hoop during retraction and extension of the foldable frame. Importantly, each of the second joint axes and the third pin axes are oriented substantially at right angles to one of the outwardly canted side members of the main hoop. Each of the companion pair of first and second joint means cooperate to permit its main guide rod to be deflectable along a transverse axis of the vehicle so that each pair of roof side frame members is aligned in side-by-side relation with its companion inclined side member of the main hoop when the folded frame is moved to its retracted position. The tonneau space is increased when the foldable frame is fully retracted since the tonneau space is determined substantially in the present invention by the diverging outwardly-canted side members of the trapezoidally shaped main hoop instead of the more narrow space between the substantially spaced-apart parallel roof side frames.

Further objects, features, and advantages of the present invention will become more apparent from the following description when taken with the accompanying drawings which show, for purpose of illustration only, an embodiment in accordance with the present invention.

BRIEF DESCRIPTION OF THE DRAWINGS

FIG. 2 shows a section through the connecting region of the roof side frame with the roof front frame; and FIG. 3 shows the roof side frame according to FIG. 2 in a side elevation.

FIGS. 8a–8c are schematic views illustrating the folding operation of a prior art frame.

DETAILED DESCRIPTION OF THE DRAWINGS

Figure 1:
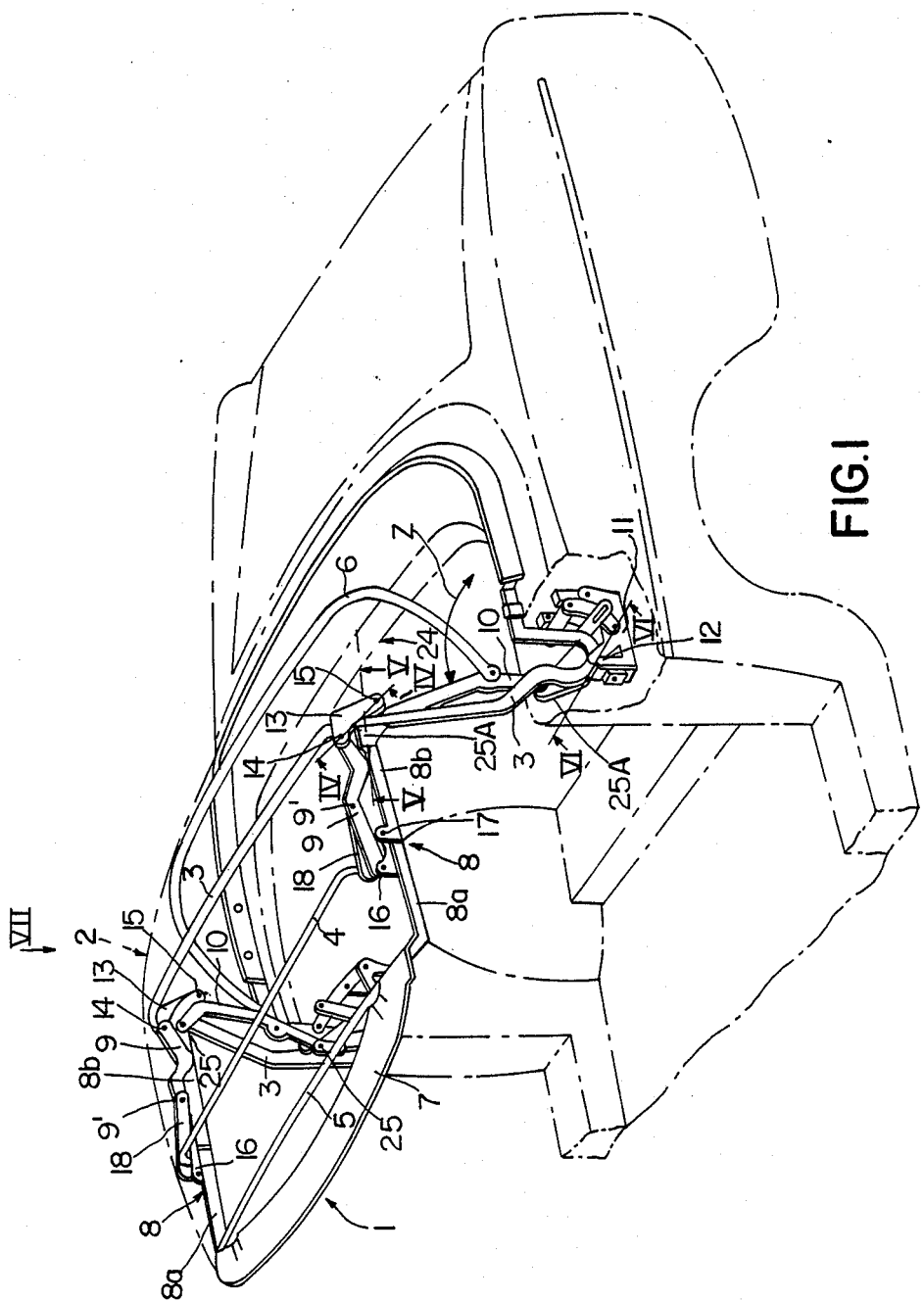
FIG. 1 shows a perspective general view of a convertible top constructed according to the present invention.
Figure 6:
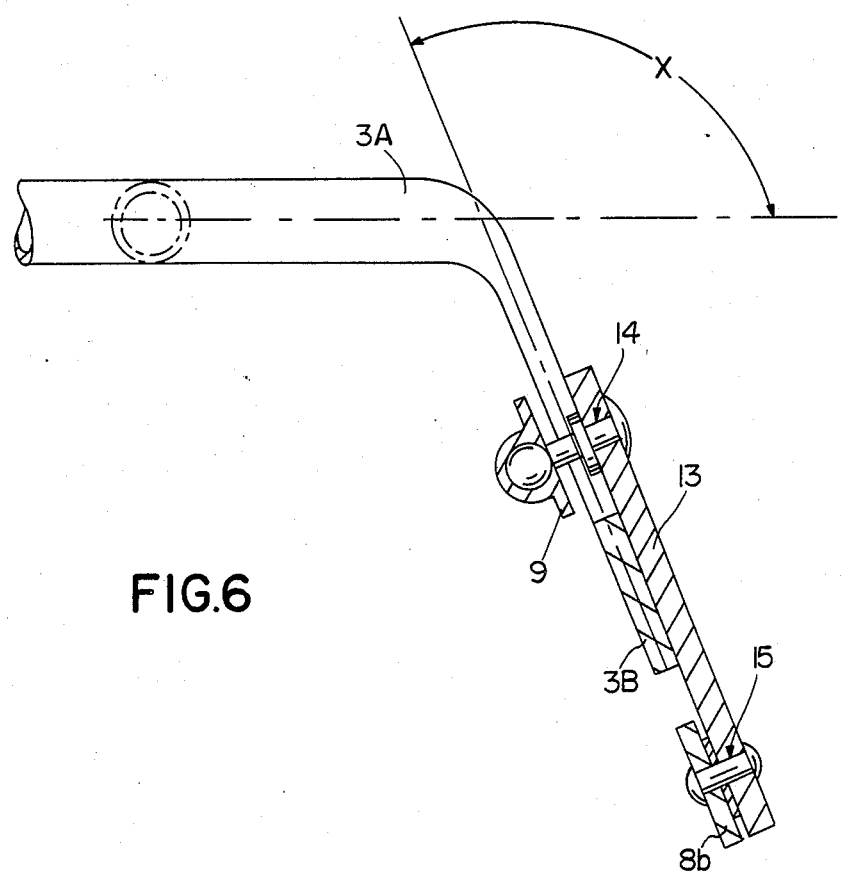
FIG. 6 is a partly perspective, partly cross-sectional view of a portion of FIG. 1.

A support frame 1 of an unfolded convertible top without cover is illustrated in FIG. 1. The support frame 1 comprises a main hoop 3 having a top member 3A and a pair of side member 3B each side member 3B being inclined to member 3A to define an obtuse angle X therebetween as best seen in FIG. 6, an intermediate hoop 4, a front auxiliary hoop 5, a corner hoop 6, a roof front frame 7, two roof side frames 8, each of which is formed by a front roof frame side part 8a and a rear roof frame side part 8b, two roof frame guide rods 9, two main guide rods 10 deflectable along a transverse axis of the vehicle as shown by arrow Z in FIG. 1 and two brackets 11 fixed to the vehicle body.

The main hoop 3 is trapezoidally shaped, so that a lateral inclination is obtained from the roof of the convertible top 2 to the side wall of the vehicle body. The bearing means of the main hoop 3 are two pivot bearings 12 in the brackets 11. The axial direction of the pivot bearings 12 is oriented at right angles to the median longitudinal plane of the motor vehicle, and therefore extends in the transverse direction of the vehicle.

Figure 4:
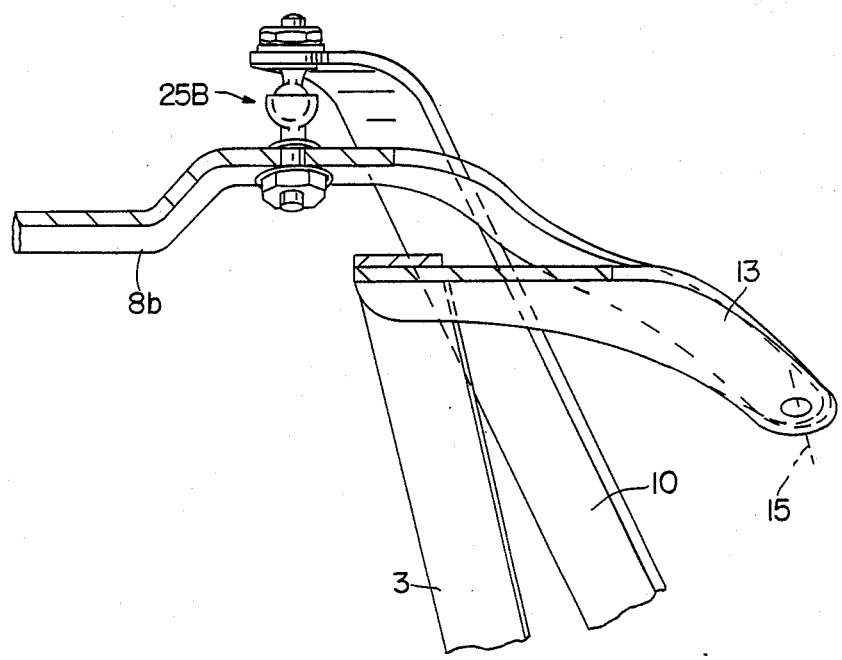
FIG. 4 is a perspective view of a portion of FIG. 1 taken along Line IV—IV.

Straps 13 are connected permanently to the main hoop 3 in the upper region of the upright side members of the main hoop 3. This connection is best shown in FIG. 4. Two pivot bearings 14 and 15 are provided on each of the straps 13. The roof frame guide rods 9 are articulated using the pivot bearings 14, and the rear roof frame side parts 8b are articulated using the pivot bearings 15. The axial direction of the pivot bearings 14 and 15 is oriented approximately at right angles to the inclination of the upright side members of the main hoop 3, as best seen in FIG. 6.

Figure 7:
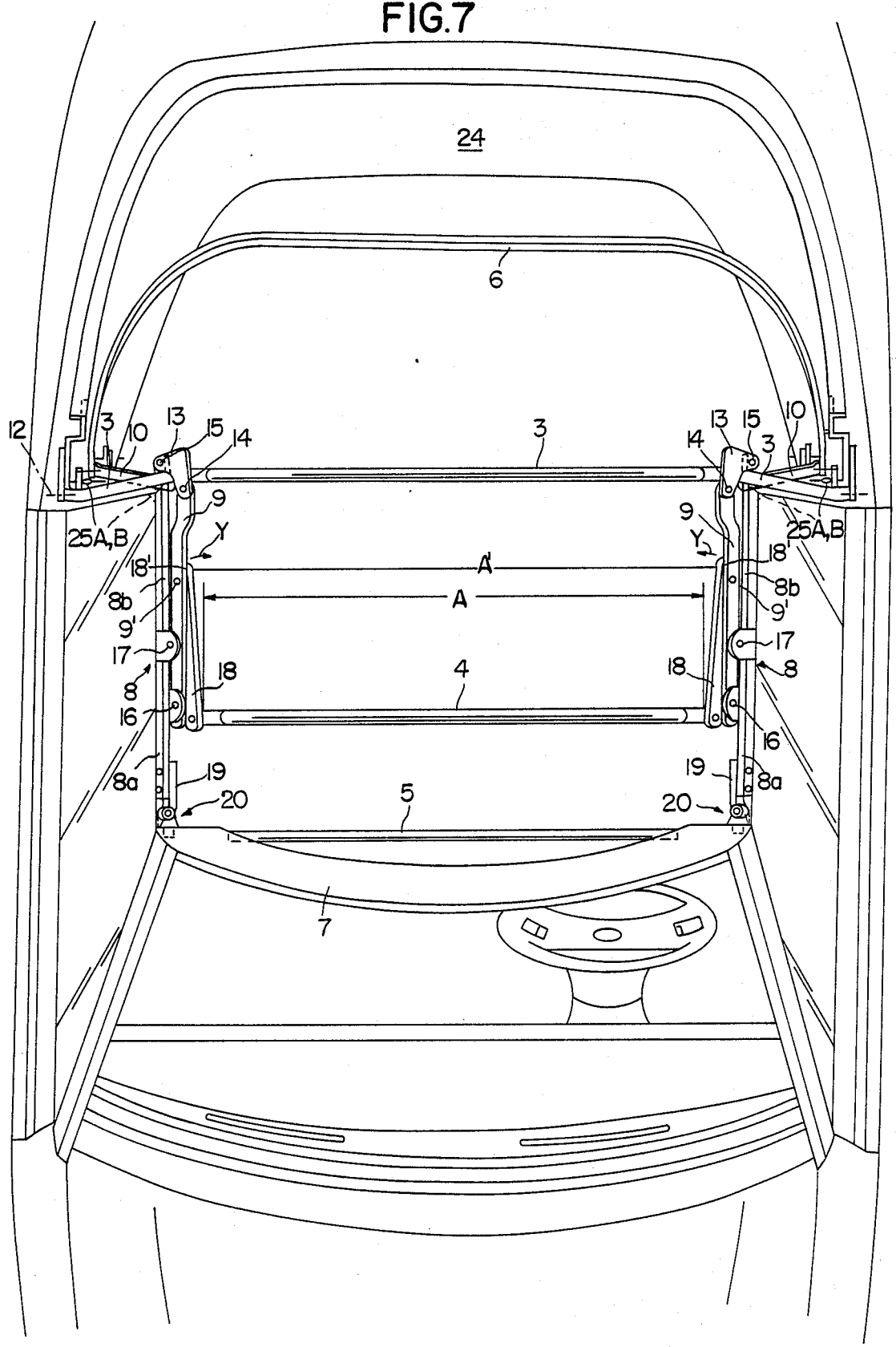
FIG. 7 is a perspective view of FIG. 1, looking in the direction of arrow VII.
Figure 10:
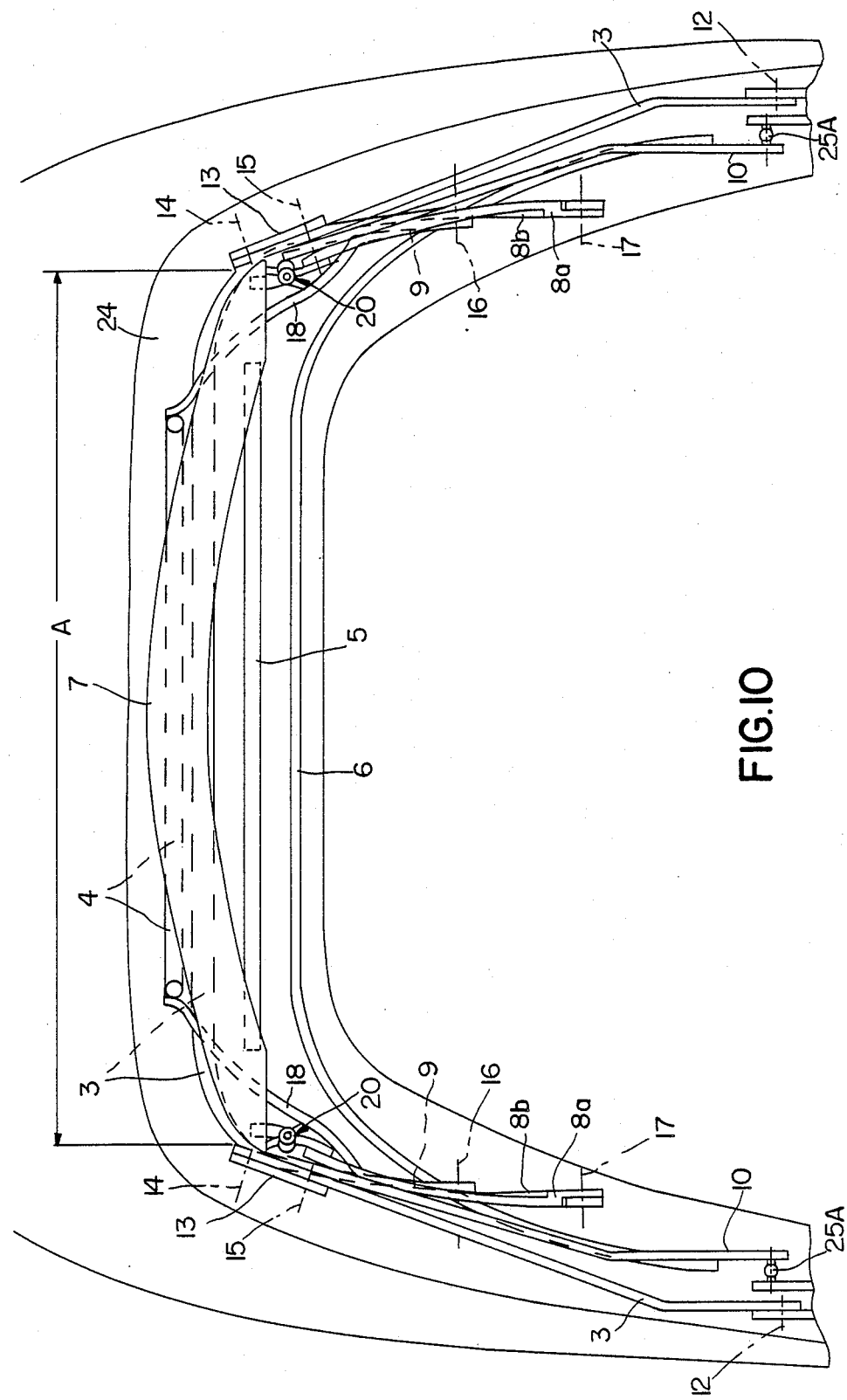
FIG. 10 is a top view of a preferred embodiment of the frame in its folded position.

The roof frame guide rods 9 are connected by two pivot bearings 16 to the front roof frame side parts 8a, and the front roof frame side parts 8a are connected by pivot bearings 17 to the rear roof frame side parts 8b (FIGS. 1, 7 and 7a). In a preferred embodiment, the axial direction of the pivot bearings 16 and 17 is aligned parallel to the axial direction of the pivot bearings 12. This embodiment is shown in FIG. 10. As can be seen in this Figure, the frame side parts 8a and 8b are very short when compared to the preferred embodiment seen in FIG. 11. The folding operation of the frame will be described later.

Figure 11:
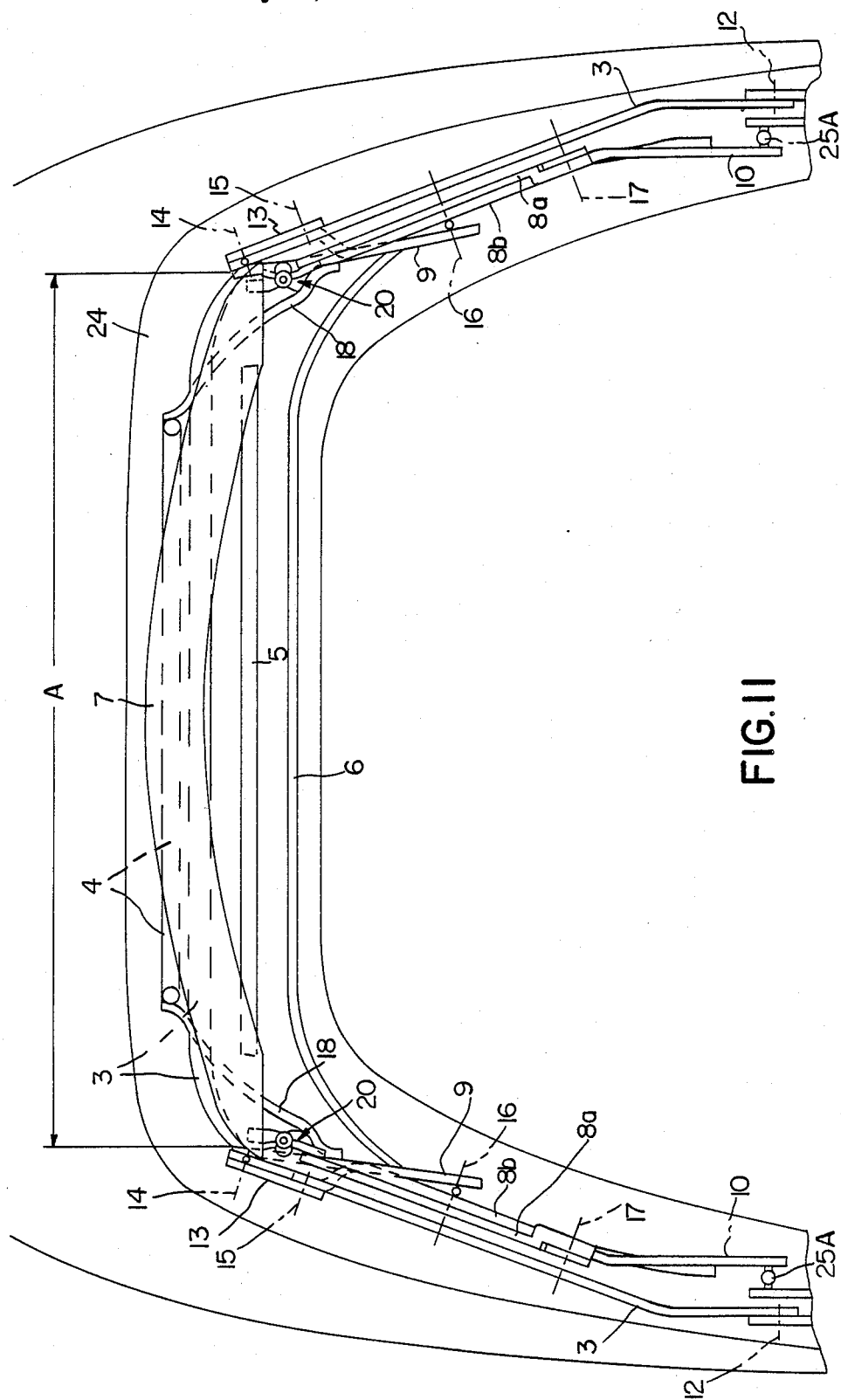
FIG. 11 is a top view of an alternate preferred embodiment of the frame in its folded position.

The main guide rods 10 are connected to the brackets 11 at their lower ends by ball and socket joints 25A. The upper ends of main guide rods 10 are connected to the rear roof frame parts by ball and socket joints 25B. During folding operation these main guide rods 10 serve together with roof frame guide rods 9 to control the kinematic movement of the roof frame side parts 8a and 8b during closing and opening of the roof frame. The kinematics of this movement of roof frame side parts 8a and 8b is described and illustrated in the publication Deutsches Museum, Abhandlungen und Berichte, 49 Jahrgang 1981, Heft 1, illustrations at pages 74 and 75. The movement of the main hoop 3 clockwise about its pivotal connection 12 (as viewed from the left vehicle side—see FIG. 1) due to the parallelogram like disposition of the pivot points 16, 17, 14, 15 and the position of the connection of rear roof frame side part 8b and connections 25A and 25B with main guide rod 10, results in pivotal clockwise movement of front roof frame side part 8a (left side of the vehicle) about pivot connection 17 and thus a folding back of front roof frame side part 8a onto rear front frame side part 8b. Note the shifting of the location of the pivot axes 14 and 15 in the rearward direction of the vehicle as the main hoop 3 is moved from the convertible top closed position 6 (FIG. 7) to the connectible top open (stored) position (FIGS. 10, 11). This folding of front side frame side part 8a onto part 8b is followed by joint pivotal movement of parts 8a and 8b above pivot connection 15 as the main hoop is pivoted further clockwise about pivot 12. As seen in side view of the vehicle, this roof frame collapsing movement is essentially similar to the prior art system depicted in the above-noted Deutsches Museum article. The specific ball and socket joints 25a and 25b are new to the present invention and serve to facilitate the special inclination of the roof frame side parts 8a and 8b during their final closing pivotal movement about axes 15, as described below in conjunction with FIGS. 9a to 9c.

Leaf springs 18, which are arranged on both sides on the intermediate hoop 4, are oriented approximately parallel to the longitudinal direction of the roof frame guide rods 9. The leaf springs 18 are subject to outwardly directed pretension and are braced by their ends against the inside of the roof frame guide rods 9 for pivotable movement at a fifth pin axis 9' as best seen in FIGS. 1 and 7. One end of the leaf spring 18 is pin connected to the roof frame guide rod 9, while the other end is pin connected to the intermediate hoop 4. The front cranked ends of the front roof frame side parts 8a are connected articulately to the roof front frame 7, as shown in FIG. 2. A rotary bearing is combined with a pivot bearing in this case.

Attached to the roof frame side part 8a is a strap 19, the end of which projecting beyond the roof frame side part 8a is of bifurcate construction and encloses a flange part 20a of a flange bolt 20. As may be seen from FIG. 3, the two components are connected pivotably by means of a transverse bolt 21, so that a pin joint is formed. A longitudinal bolt 20b of the flange bolt 20 is additionally mounted rotatably in a sleeve 22. The sleeve 22 exhibits a male screw thread and is engaged with a female screw thread of a bore made in the roof front frame 7 in the longitudinal direction of the vehicle. The axial guidance of the longitudinal bolt 20 in the sleeve 22 occurs by a flange of the flange bolt 20 and an annular member 23.

Due to this type of bearing means, the roof side frames 8 are pivotable about a vertical axis relative to the roof front frame 7, and simultaneously rotatable about an axis extending in the longitudinal direction of the vehicle.

The convertible top 2 can be folded up by a positive control, known per se, of the linkage members formed by the support 1, and lowered into a hood box 24.

The folding operation of the top will now be described, with reference first to the folding of a top described in the prior art. As seen in FIGS. 8a–c, from the folded-out position of FIG. 8a, the prior art top frame has its front frame 7' and side frames 8a' folded back first, into the position illustrated in front view in FIG. 8b. Then, as the main hoop 3' is folded back into the recess, the side frames 8a' and 8b' are rotated as a unit around pins 15' and folded into the position shown in FIG. 8c. The side frames 8a' and 8b' follow a course parallel to the longitudinal median plane of the vehicle, since the axes of the pins 15' are perpendicular to this plane.

Figure 9A:
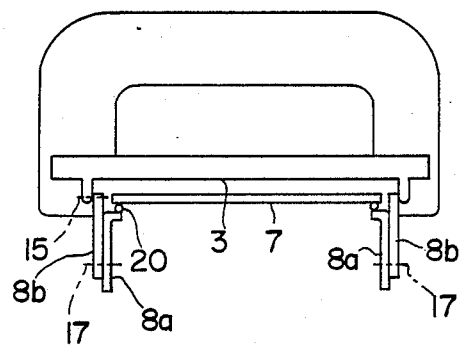
FIGS. 9a–9c are schematic views illustrating the folding operation of an embodiment of the frame of the present invention.
Figure 9B:
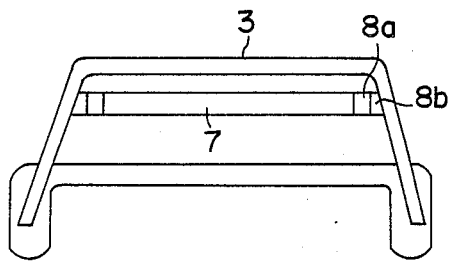
Figure 9C:
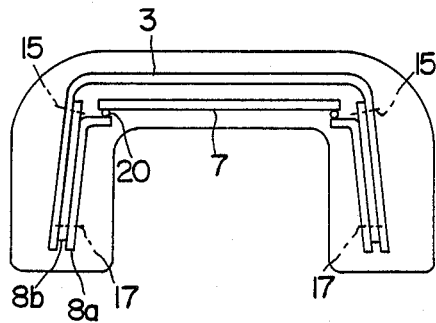

The folding operation of the present invention is best shown with reference to FIGS. 9a–c. Like the prior art top, in the folded-out position, the axis of pivot bearing 17 is perpendicular to the longitudinal median plane of the vehicle. However, unlike the prior art top, the axis of pivot bearing 15 is perpendicular not to the longitudinal median plane, but rather to the inclined side members of the main hoop 3. As in the folding of the prior art top, the side frame parts 8a are first folded against side frame parts 8b around pivot bearings 17, into the position shown in FIG. 9a. This position is seen in front view in FIG. 9b. The side frames 8a and 8b are then pivoted as a unit around the inclined pivot bearings 15. There is no binding as the side frames 8a and 8b are connected to the assembly by the rotatable and pivotable connection to the roof front frame 7, and by the pivot bearings 15. Thus, the free ends of the side frames 8a and 8b (containing pivot bearing 17) are free to follow the folding path dictated by the inclination of pivot bearings 15. The outward pretensioning of the leaf springs 18 facilitate the outward deflection of the side frames 8a and 8b during folding.

By this inclining of the pivot bearings 15, each pair of roof side frames 8a and 8b becomes aligned substantially parallel to the inclined side members of the main hoop 3, as shown in FIGS. 10 and 11. In the embodiment of FIG. 10, the side frames 8a and 8b are parallel over a substantial part of their course. In both embodiments, the folded roof frame of the present invention occupies much less room in the tonneau space than the prior art roof frame.

Figure 5:
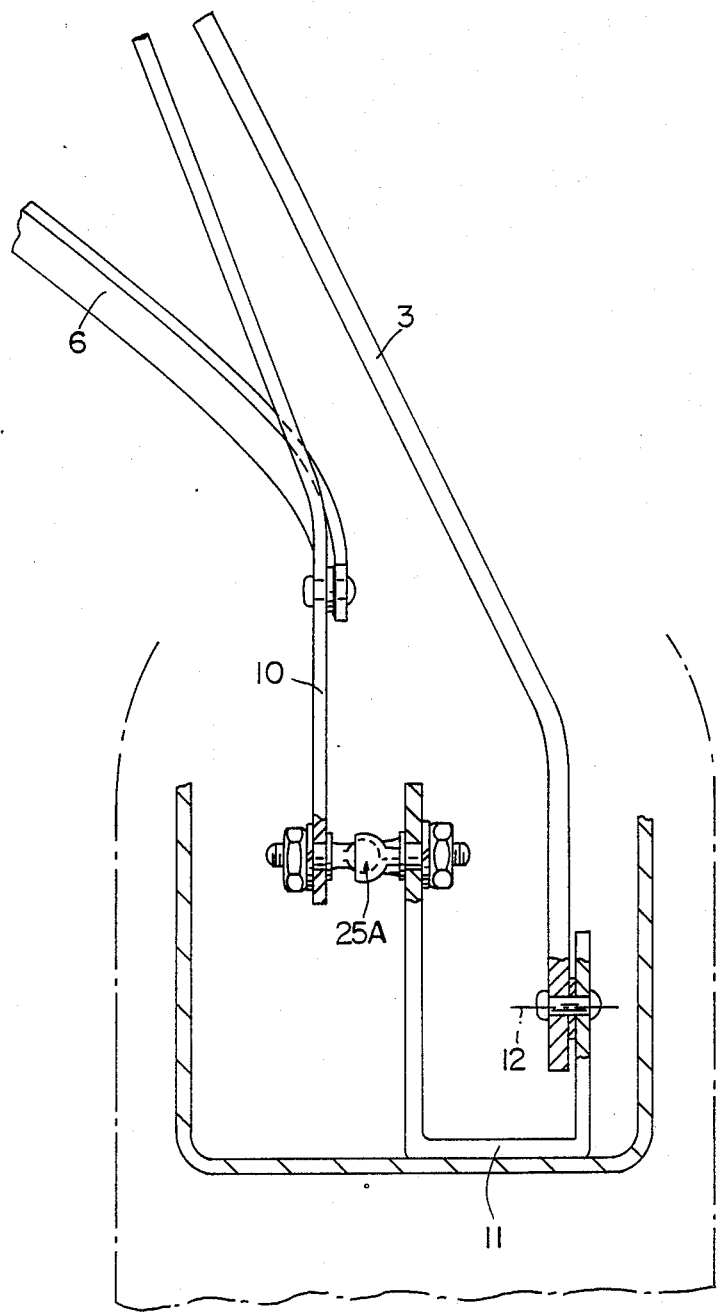
FIG. 5 is a cross-sectional view of a portion of FIG. 1 taken along Line V—V.

By virtue of the inclination of the axes of the pivot bearings 14 and 15, and of the articulate connection of the roof side frames 8 to the roof front frame 7, the support 1 can be folded without tension, while the front and rear roof side frames 8a and 8b are located superposed and substantially parallel on the upright side members of the main hoop 3 in the folded state. Because the roof side frames 8 deviate laterally during the folding of the support frame 1, the main guide rods 10 execute a wobble movement, which is permitted by the use of ball and socket joints 25A and 25B, illustrated in FIGS. 4 and 5. The compensation of the greater width A' of the intermediate hoop 4 shown in FIG. 7 when the top is in an extended position by the leaf springs 18 to the narrower width A when the top is retracted as shown in FIGS. 10 and 11 facilitates the folding operation of the convertible top 2 due to the inward deflection of second ends 18' of the leaf springs 18 as shown by arrow Y of FIG. 7 and, because it pretensions the roof side frames 8 in an outward direction and therefore promotes the deflection of the roof side frames 8 during folding of the top.

In case the distance of the joints between the front roof frame side parts 8a and the roof front frame 7 does not coincide with the interval between the pivot bearings 15, an additional inclination of the axes may be provided at the pivot bearings 17 in the folded position. This is seen in the preferred embodiment of FIG. 11. However, it must be considered in this context that the pivot bearings 14 and 16 of the roof frame guide rods 9 must likewise be constructed as ball and socket joints, in order that the wobble movement of the roof side frames 8 which then occurs during the folding back of the convertible top 2 does not lead to jamming of the bearings. All the other bearing points are unaffected by this.

Although the invention has been described in detail with reference to certain preferred embodiments and specific examples, variations and modifications exist within the scope and spirit of the invention as described and defined in the following claims.

What is claimed is:

1. A foldable frame for supporting a convertible top of a vehicle having a tonneau space, the foldable frame being movable between a retracted and an extended position and comprising:

a main hoop mounted to respective opposite sides of the vehicle for pivotable movement about a transverse axis of the vehicle, the main hoop defining a pair of diverging, laterally spaced-apart side members and an integral top member therebetween, each side member being inclined in relation to the top member to define an obtuse angle therebetween.

a pair of main guide rods, each main guide rod including a proximal end, a distal end, and first joint means for coupling the proximal end to one of the respective opposite sides of the vehicle body for swivel movement, a pair of foldable roof side frames which form substantially spaced-apart parallel roof side frames when the foldable top is fully extended, each roof side frame including a front member, a rear member, first pin means for coupling the front member to the rear member for pivotal movement about a first pin axis, and second joint means for coupling the rear member to the distal end of one of said main guide rods for swivel movement, a pair of roof frame guide rods for controlling the movement of the front members of each of the foldable roof side frames, each roof frame guide rod including a forward end, a rearward end, and second pin means for coupling the forward end to one of the front members for pivotal movement about a second pin axis, third pin means for coupling the rearward end to the main hoop for pivotal movement about a third pin axis, and fourth pin means for coupling the rear member to the main hoop for pivotal movement about a fourth pin axis, a roof front frame, articulated means for coupling the roof front frame to each of the front members of the foldable roof side frames, said roof front frame spanning the space between the said pair of foldable roof side frames, said articulated means permitting said front members to pivot about a substantially vertical axis relative to said front frame and rotate about an axis extending in a longitudinal direction of the vehicle, an intermediate hoop means situated intermediate the roof front frame and the main hoop, the intermediate hoop means including yieldable means for varying a length of the intermediate hoop means during retraction and extension of the foldable frame and opposite ends, and means for connecting each of the ends of the intermediate hoop means to one of the roof frame guide rods for pivotable movement in relation thereto, each of the fourth pin axes and the third pin axes being oriented substantially at right angles to the associated lateral inclination of the main hoop, each of said first and second joint means cooperating to permit its main guide rod to be deflectable along a transverse axis of the vehicle so that each pair of roof side frame members is aligned in side-by-side relation with one of the pair of side members of the main hoop when the foldable frame is moved to its retracted position, whereby when the foldable frame is fully retracted, the tonneau space is determined substantially by the diverging dimensions of side members instead of a more narrow space between the substantially spaced-apart parallel roof side frames at such time as the foldable frame is fully extended.

2. The foldable frame of claim 1, wherein the intermediate hoop means is elongated and is subject to spring pretension relative to the roof side frames in the longitudinal direction of the elongated intermediate hoop means.

3. The foldable frame of claim 1, wherein the yieldable means include a leaf spring.

4. The foldable frame of claim 3, wherein each leaf spring includes opposite ends, a first end being fixed to an intermediate hoop and a second end having fifth pin means.

5. The foldable frame of claim 1, wherein the first and second joint means each include a ball and socket joint.

6. The foldable frame of claim 1, wherein the first pin axes are oriented substantially at a right angle to one of the inclined side members of the main hoop and each roof frame guide rod is deflectable about the third pin axis.

7. A foldable frame for supporting a convertible top of a vehicle having a tonneau space, the foldable frame being movable between a retracted and an extended position and comprising:

a main hoop mounted to respective opposite sides of the vehicle for pivotable movement about a transverse axis of the vehicle, the main hoop having a pair of diverging laterally spaced-apart outwardly canted side members which are canted relative to a vertical axis of the vehicle, a pair of main guide rods, each main guide rod including a proximal end, a distal end, and first joint means for coupling the proximal end to one of the respective opposite sides of the vehicle body for swivel movement, a pair of foldable roof side frames which form substantially spaced-apart parallel roof side frames when the foldable top is fully extended, each roof side frame including a front member, a rear member, first pin means for coupling the front member to the rear member for pivotal movement about a first pin axis, second joint means for coupling the rear member to the distal end of one of said main guide rods for swivel movement, and second pin means for coupling the rear member to the main hoop for pivotal movement about a second pin axis, a roof front frame connected to the roof side frames, a pair of roof frame guide rods for controlling the movement of the front members of each of the foldable roof side frames, each roof frame guide rod including a forward end, a rearward end, and third pin means for coupling the forward end to one of the front members for pivotal movement about a third pin axis, and fourth pin means for coupling the rearward end to the main hoop for pivotal movement about a fourth pin axis, an intermediate hoop means situated intermediate the roof front frame and the main hoop, the intermediate hoop means including yieldable means for varying a length of the intermediate hoop means during retraction and extension of the foldable frame opposite ends, and means for connecting each of the ends of the intermediate hoop means to one of the roof frame guide rods for pivotable movement in relation thereto, each of the second pin axes and the fourth pin axes being oriented substantially at right angles to one of the outwardly canted side members of the main hoop, each of the companion pair of first and second joint means cooperating to permit its main guide rod to be deflectable along a transverse axis of the vehicle so that each pair of roof side frame members is aligned in side-by-side relation with one of the pair of outwardly canted side members of the main hoop when the foldable frame is moved to its retracted position;

whereby, when the foldable frame is fully retracted, the tonneau space is determined substantially by a spacing of the diverging outwardly-canted side members of the trapezoidally shaped main hoop instead of a more narrow spacing between the substantially spaced-apart parallel roof side frames when the folding top is fully extended.

8. A foldable frame for supporting a convertible top of a vehicle having a tonneau space, the foldable frame being movable between a retracted and an extended position, and comprising;

a main hoop mounted to respective opposite sides of the vehicle for pivotable movement about a transverse axis of the vehicle, the main hoop defining a pair of diverging, laterally spaced-apart side members and an integral top therebetween, each side member being inclined in relation to the top member to define an obtuse angle therebetween, a pair of foldable side frame linkage means, each of said pair of said foldable side frame linkage means being connected to a corresponding side member and being folded to substantially half of an extended length when said foldable frame is in said retracted position, and aligning means for aligning each of said folded frame linkage means substantially parallel to a corresponding said side member when said foldable frame is in said retracted position.

9. The foldable frame of claim 8, wherein said aligning means includes at least one first pin connection having an inclined pivot axis relative to said transverse axis of the vehicle, and said side frame linkage means includes at least one pin connection having a pivot axis parallel relative to said transverse axis, when said foldable frame is in said extended position.

10. The foldable frame of claim 9, wherein each said side frame linkage means includes a pair of foldable roof side frames.

11. A foldable frame for supporting a convertible top of a vehicle having a tonneau space, the foldable frame being movable between a retracted and an extended position, and comprising:

a front roof frame, a main hoop mounted to respective opposite sides of the vehicle for pivotable movement about a transverse axis of the vehicle, the main hoop defining a pair of diverging, laterally spaced-apart side members and an integral top therebetween, each side member being inclined in relation to the top member to define an obtuse angle therebetween, a pair of side frame linkage means, each of said pair of said side frame linkage means connected to a corresponding side member, and aligning means for aligning each of said frame linkage means substantially parallel to a corresponding said side member when said foldable frame is in said retracted position,
wherein said aligning means includes at least one first pin connection having an inclined pivot axis relative to said transverse axis of the vehicle, and said side frame linkage means includes at least one pin connection having a pivot axis parallel relative to said horizontal axis, when said foldable frame is in said extended position,
wherein each said side frame linkage means includes a pair of foldable roof side frames, and wherein each said pair of foldable roof side frames are coupled to said front roof frame by coupling means which allow said roof side frames to rotate about a longitudinal axis of said vehicle, and pivot about a substantially vertical axis relative to the front roof frame, during retraction and extension of the foldable frame.

12. The foldable frame of claim 11, wherein said aligning means further includes connecting means for connecting an intermediate hoop means to said roof side frames, the intermediate hoop means including yieldable means for varying a length of the intermediate hoop means during retraction and extension of the foldable frame.

* * * * *